United States Patent [19]

Millar et al.

[11] 3,894,712

[45] July 15, 1975

[54] EXCESS FLOW SERVO VALVE

[75] Inventors: James S. Millar, Fountain Valley; Douglas R. Garrett, Los Angeles, both of Calif.

[73] Assignee: Parker-Hannifin Corporation, Cleveland, Ohio

[22] Filed: July 6, 1973

[21] Appl. No.: 377,032

[52] U.S. Cl. ............... 251/61; 137/625.66; 251/75
[51] Int. Cl. ......................................... F16k 31/165
[58] Field of Search..... 137/596.18, 625.21, 625.24, 137/625.66; 251/63.4, 73, 75, 61; 236/47, 48 R

[56] References Cited
UNITED STATES PATENTS

| 727,917 | 5/1903 | Dyer | 137/625.24 X |
|---|---|---|---|
| 1,819,993 | 8/1931 | Winter | 236/48 R |
| 1,946,029 | 2/1934 | Midnight | 236/48 R |
| 1,952,265 | 3/1934 | Leland | 236/48 R |
| 2,267,688 | 12/1941 | Landon | 236/48 R |
| 2,794,600 | 6/1957 | Ehlke | 251/75 X |
| 3,030,778 | 4/1962 | Taylor | 137/625.66 X |
| 3,105,637 | 10/1963 | Puster et al. | 251/75 X |
| 3,116,905 | 1/1964 | Puster et al. | 251/75 X |
| 3,338,268 | 8/1967 | Houser et al. | 137/625.66 |
| 3,353,559 | 11/1967 | Phillips | 251/75 X |

*Primary Examiner*—William R. Cline
*Assistant Examiner*—Gerald A. Michalsky
*Attorney, Agent, or Firm*—Diller, Brown, Ramik & Wight

[57] ABSTRACT

A servo valve particularly constructed for use with a pressure regulator valve for controlling the operation of a pilot valve to automatically operate a shut-off valve of the regulator when there is an excessive rate of flow through the regulator. The servo valve is provided with two selectable settings providing for low and high flow rates through the regulator.

2 Claims, 5 Drawing Figures

EXCESS FLOW SERVO VALVE

This invention relates in general to new and useful improvements in servo valves, and more particularly to a novel servo valve for use in controlling a pilot valve for effecting the actuation of a shut-off valve when the servo valve senses excessive flow through the regulator with which it is associated.

BACKGROUND OF THE INVENTION

Excess flow shut-off servo valves are well known. A typical servo valve of this type is disclosed in U.S. Pat. No. 3,351,094. Servo valves used in combination with pressure regulators control the flow of air from a pressurized source to a pilot valve and are operable when excess flow through the regulator is sensed to interrupt the flow of pressurized air to the pilot valve and permit the pilot valve to be operative to actuate a shut-off valve of the regulator.

Prior art devices have worked satisfactorily. However, with adjustment, they are set for use in conjunction with only one excess flow condition. There are times, however, when an associated regulator may be alternatively used in conjunction with different permissible flow rates.

SUMMARY OF THE INVENTION

In accordance with this invention, there is provided a servo valve having stabilizing means including means for selectively applying high and low stabilizing pressure on the valve mechanism thereof whereby the servo valve may be selectively set to be actuated in response to different excess flow rates through an associated regulator.

The stabilizing means is of the resilient over-center toggle type which includes a pivot for the toggle with the pivot having a normal retracted position for low pressure control and an advanced position for high pressure control.

The mounting of the pivot for movement between the retracted position and the advanced position is simple and merely includes a movable support carrying the pivot and a manual actuator to effect the advancement of the movable support.

Another feature of the stabilizing means is that the pivot is adjustably carried by the movable support so that it may be readily adjusted to provide the desired low stabilizing pressure. In a like manner, the movable support is provided with an adjustable extension to be engaged by the manual actuator so as to provide for the adjustment of the high stabilizing pressure.

Advantageously, the servo valve includes a rotatable valve shaft carrying the valve element with the stabilizing means including a further pivot on the valve shaft. The valve element is in the form of a simple disc having a peripheral flow passage and suitable axial passages communicating with the peripheral passage and opening through a face of the disc.

With the above and other objects in view that will hereinafter appear, the nature of the invention will be more clearly understood by reference to the following detailed description, the appended claims and the several views illustrated in the accompanying drawings:

IN THE DRAWINGS

Figure 2:
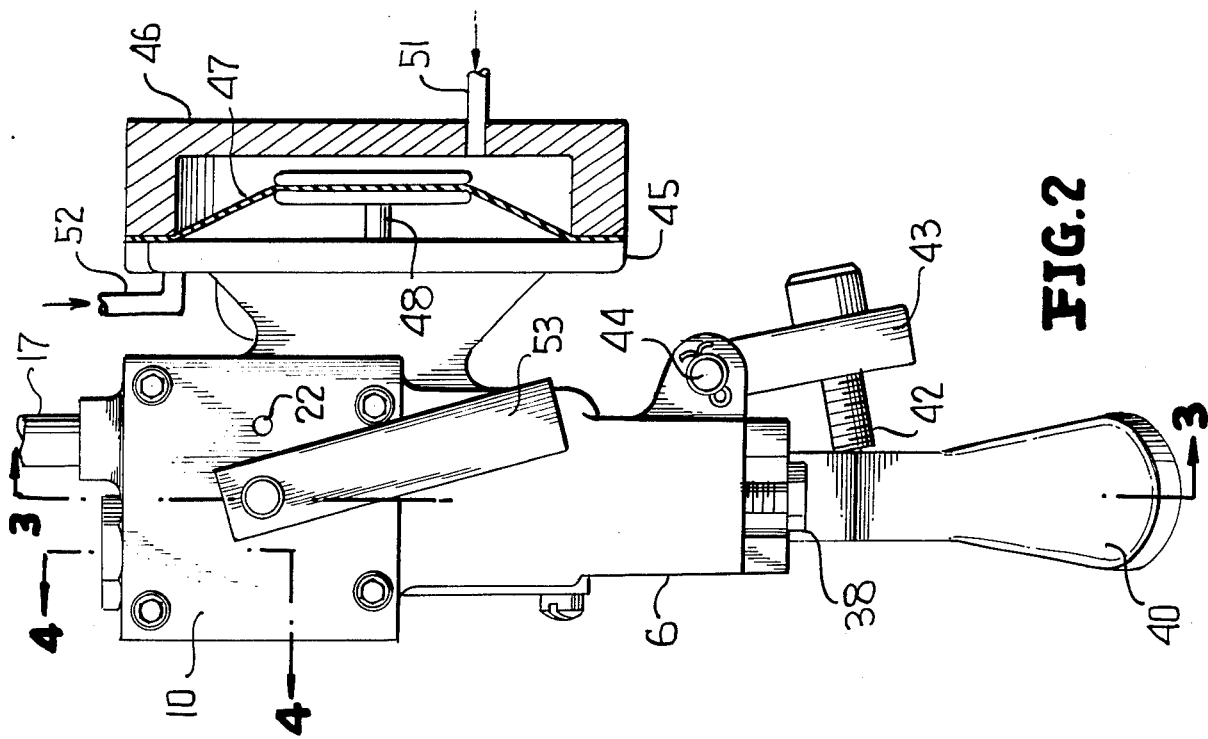
FIG. 2 is an elevational view of the servo valve with parts broken away and shown in section.
Figure 1:
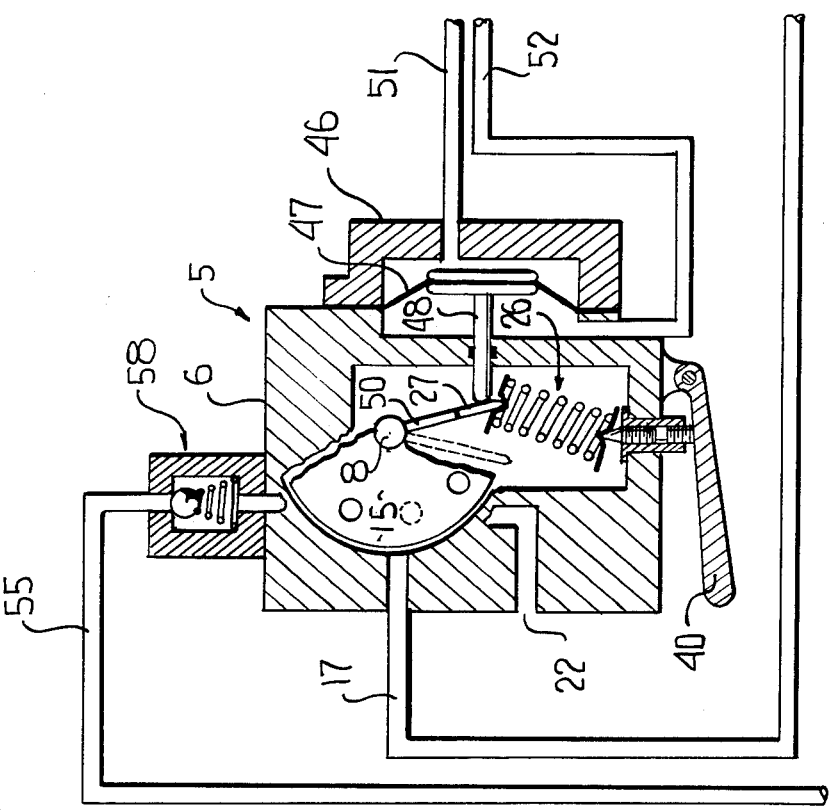
FIG. 1 is a schematic view of the servo valve.

In the drawings, the servo valve is generally identified by numeral 5 and includes housing 6 defining internal cavity 7. Valve shaft 8 extends across cavity 7 and is rotatably journalled in housing 6.

Housing 6 in combination with removable end cap 10 defines valve cavity 11 sealed from cavity 7 by seal 12 and from atmosphere by seals 13,14. Valve disc 15 is carried by shaft 8 within cavity 11 for rotation with shaft 8.

Valve disc 15 has peripheral passage 16 opening into cavity 11 and in communication with flow line 17 also in communication with cavity 11.

Figure 5:
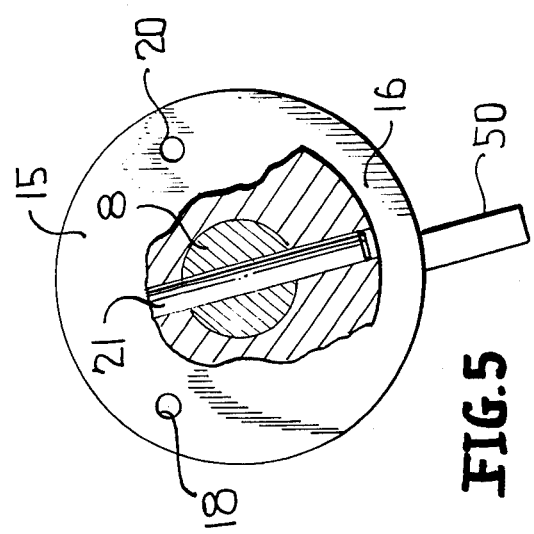
FIG. 5 is an enlarged elevational view of the valve disc and shaft with parts broken away.

Disc 15 (FIR. 5) also includes two axial passages 18,20 which extend (FIG. one face of disc 15 into peripheral passage 16. Also shown in FIG. 5 is securement of disc 15 to shaft 8 by pin 21.

Figure 4:
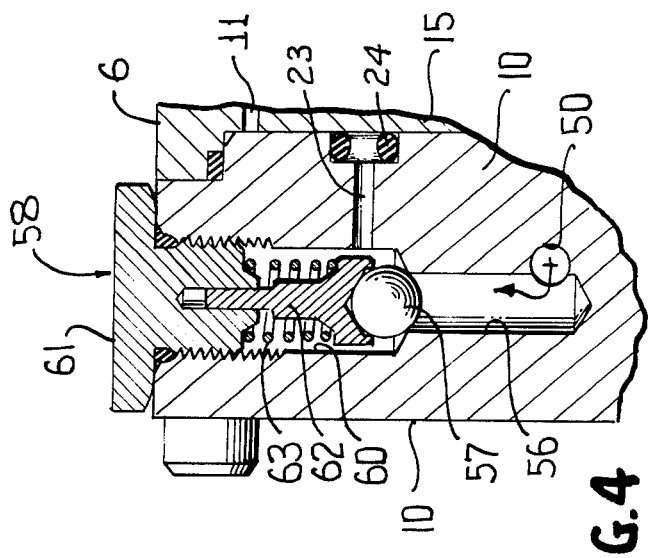
FIG. 4 is an enlarged fragmentary sectional view taken along the line 4—4 of FIG. 2.

End cap 10 (FIG. 2) has vent passage 22 opening into cavity 11 in opposition to face of disc 11. End cap 10 (FIG. 4) also has pressurized air passage 23 opening into cavity 11 in opposition to face of disc 15. Passage 23 is sealed relative to disc 15 by seal ring 24. Vent passage 22 is sealed in similar manner (not shown). Disc 15 is resiliently urged against end cap 10 and seals flow passages 22,23 by spring 25 (FIG. 3).

Figure 3:
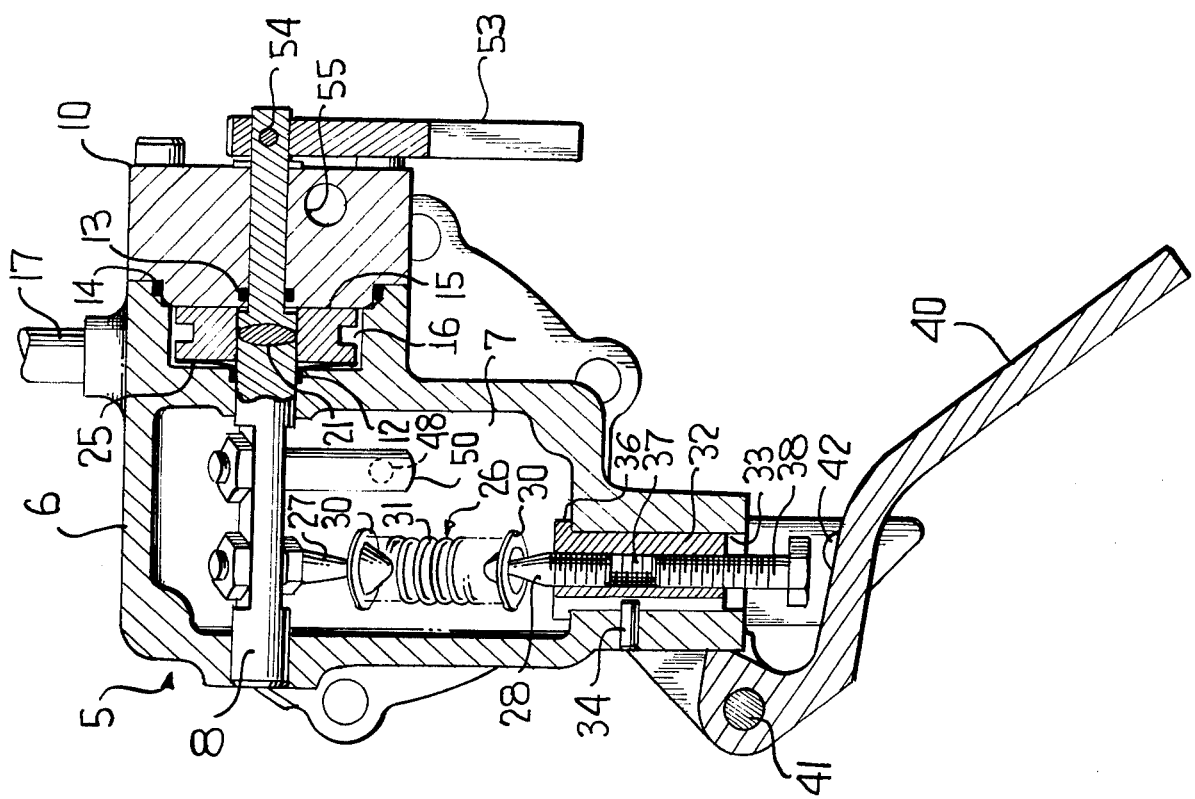
FIG. 3 is a vertical sectional view taken along the line 3—3 of FIG. 2.

Valve shaft 8 and disc 15 are held in a normal Servo position with passages 16 and 18 communicating passage 23 with passage 17 by a shaft stabilizing assembly 26 of the resilient over-center toggle type (FIG. 3). Stabiliing assembly 26 includes pivot 27 fixedly secured to shaft 8 and pivot 28 adjustably carried by housing 6. Pivots 27, 28 carry spring guides 30 between which a compressed coil spring 31 extends.

Pivot 28 is carried by slide 32 slidably mounted in housing bore 33 and prevented from rotating by pin 34 seated in groove 35 and slide 32.

Slide 32 has shoulder 36 engaging housing 6 and normally limiting movement of slide 32 away from shaft 8. Pivot 28 is threaded in threaded bore 37 of slide 32 for adjustment and through spring 31 exerts a low stabilizing pressure on shaft 8.

Slide 32 has headed extension 38 adjustably threaded in threaded bore 37 and projecting from housing 6 for engagement by manually actuated lever 40 pivotally mounted relative to housing 6 by pin 41. Lever 40 is engageable with extension 38 to move slide 32 and pivot 28 into housing 6 to apply high stabilizing pressure on shaft 8.

Lever 40 may be latched in position shifting slide 32 by pin 42 engaging therebehind. Pin 42 (FIG. 2) is carried for pivotal movement by latch member 43 pivotally mounted relative to housing 6 by pin 44.

Housing 6 has mounting flange 45 removably receiving diaphragm assembly including case 46 and diaphragm 47. Diaphragm 47 carries actuator rod 48 which projects into cavity 7 and engages lever pivot 50 fixedly carried by shaft 8.

Flow passages 51,52 open into case 46 on opposite sides of diaphragm 47. When pressure acting on diaphragm 47 through flow passage 51 becomes excessive, diaphragm 47 shifts to the left, moving rod 48 to the left with rod 48 engaging lever pivot 50 and overcoming stabilizing force of stabilizing assembly 26 to rotate shaft 8 closing communication between pressurized air passage 23 and flow passage 17. Passage 20 becomes aligned with vent passage 22 and vents cavity 11 and flow passage 17 to atmosphere, thus romoving control pressure in flow passage 17 from pressurized air source.

Servo valve 5 may be reset by means of reset lever 53 secured to shaft 8 by pin 54 externally of housing 6.

Pressurized air is delivered to servo valve 5 through passage 55 (FIG. 4) and enters passage 56 closable by check ball 57 of check valve assembly 58. Check valve assembly 58 is removably carried by end cap 10 within vbore 60 which communicates with passages 23,56. Check valve assembly 58 includes plug 61 threaded into bore 60 and carrying axially movable ball guide 62 which, through spring 63, resiliently urges ball 57 to seated position closing passage 56 from bore 60. Normal proper air pressure within passage 56 unseats ball 57 and delivers air to passage 23.

OPERATION

It is to be understood that flow passages 51,52 will be connected to different portions of a pressure regulator wherein there will be a pressure differential depending upon the rate of liquid flow through the pressure regulator with the pressure in flow passage 51 normally being higher than that flow passage 52 but not sufficiently greater to actuate diaphragm 47. Normally pressurized air from passage 55 will flow into flow passage 17 to a pilot valve for controlling the actuation of a shut-off valve of the pressure regulator. When the pressure differential on opposite sides of diaphragm 47 becomes such so as to permit rod 47 to overcome stabilizing device 26, shaft 8 rotates and valve disc 15 shuts off pressurized air supply to flow passage 17 and vents flow passage 17 to atmosphere.

This will cause pilot valve (not shown) to actuate shut-off valve of regulator and stop flow.

When excess flow conditions are normalized, servo valve 5 may be reset by reset lever 53.

Although only a preferred embodiment of the invention has been specifically illustrated and described herein, it is to be understood that minor modifications may be made in the servo valve without departing from the spirit and scope of the invention, as defined by the appended claims.

What is claimed is:

1. A servo valve responsive to pressure variations for selectively pressurizing a control line, said valve including a movable means carrying a valve element for movement between a normal position and a control position, actuator means connected to said movable means for moving same in response to controlling pressure variations, and stabilizing means connected to said movable means resisting movement thereof from both said valve element normal position and said valve element control position, said stabilizing means including means for selectively applying high and low stabilizng pressure on said movable means, said stabilizing means being of the resilient over-center toggle type and including a pivot having a normal retracted position for low pressure control of said valve and an advanced position for high pressure control of said valve, said pivot being carried by an axially slidable movable support, and said stabilizing means including a manual actuator engageable with said movable support to manually axially slide said movable support and said pivot between said pivot retracted position and advanced position, said movable support including an adjustable extension engageable by said manual actuator for varying said high stabilizing pressure.

2. A servo valve responsive to pressure variations for selectively pressurizing a control line, said valve including a movable means carrying a valve element for movement between a normal position and a control position, actuator means connected to said movable means for moving same in response to controlling pressure variations, and stabilizing means connected to said movable means resisting movement thereof from both said valve element normal position and said valve element control position, said stabilizing means including means for selectively applyiing high and low stabilizing pressure on said movable means, said stabilizing means being of the resilient over-center toggle type and including a pivot having a normal retracted position for low pressure control of said valve and an advanced position for high pressure control of said valve, said pivot being carried by an axially slidable movable support, said stabilizing means including a manual actuator engageable with said movable support to manually axially slide said movable support and said pivot between said pivot retracted position and advanced position, and means mounting said pivot for adjustment relative to said movable support to vary said low stabilizing pressure.

* * * * *